Bennett Bovarnick
Harold W. Flood
INVENTORS

BY [signature]
Attorney

Bennett Bovarnick
Harold W. Flood
INVENTORS

Bennett Bovarnick
Harold W. Flood
INVENTORS

Feb. 21, 1967   B. BOVARNICK ET AL   3,305,349
METHOD OF MAKING COMPOSITE MATERIALS
AND RESULTING PRODUCTS
Filed March 17, 1964                      4 Sheets-Sheet 4

Bennett Bovarnick
Harold W. Flood
*INVENTORS*

United States Patent Office 3,305,349
Patented Feb. 21, 1967

3,305,349
METHOD OF MAKING COMPOSITE MATERIALS
AND RESULTING PRODUCTS
Bennett Bovarnick, Newton, and Harold W. Flood, South
Acton, Mass., assignors to Arthur D. Little, Inc., Cambridge, Mass., a corporation of Massachusetts
Filed Mar. 17, 1964, Ser. No. 352,531
10 Claims. (Cl. 75—.5)

This invention relates to a method of forming a chemically homogeneous composite solid product, and more particularly to a method of forming a solid material which contains metals, metal oxides, or a combination of these so thoroughly dispersed as to form a homogeneous body of material.

Composite systems and their uses

There is a need for an economical method for forming solid composites in which the constituents are homogeneously mixed and which approach or actually attain molecular dispersion. These composite materials include alloys, the so-called dispersion-hardened alloys, cermets, and refractories or ceramics.

Such systems of composite materials have not, in actual practice, been used to any great extent because it is extremely difficult to make them; and although some techniques have been developed, they apparently are limited to expensive products which can be used in only very limited applications. However, each system of this class of materials has many potential uses provided they can be made available at a reasonable cost.

Metal-metal composite systems of this type, which are in effect specialized alloys, can be formed for example into a variety of magnetic materials, into strengthened alloys for sintered powdered metallurgy structural parts, into heavy metal alloys (e.g., W-Ni-Cu), into catalysts, and into electrical contact materials.

One of the more recent developments in metallurgy is the concept of dispersion-hardened alloys which offer the promise of extending the operating temperature of a metal. Dispersion-hardening and strengthening, as this technique is called, consists of dispersing, as a minor constituent, a finely divided refractory second phase throughout a metal matrix, generally by powder extrusion. Ideally, the finely dispersed phase acts as a "key" to prevent slip of the metal grains under stress and gives the composite material very high creep resistance, hardness, and structural stability at high temperatures at some sacrifice of room temperature ductility and toughness. Since the metal remains as the continuous phase, properties such as ductility and workability are metallic rather than ceramic in character. Such metal-refractory composite materials have been proposed as hardware items which must be capable of withstanding severe mechanical and/or thermal load conditions. They also offer possibilities in applications such as nuclear fuel elements, catalysts, and carburized composites in cutting tools, drills and the like.

Finally the systems of metal oxide-metal oxide have large potential applications in ferrites and ceramic magnets, transducer elements, nuclear fuel elements, ceramic catalysts, refractories and pigments.

The prior art

The prior art contains a number of methods for mixing or dispersing insoluble constituents into a base metal or metal oxide. These constituents may be another metal or metal oxide. One such method is that of precipitation in which a metal such as a hydroxide or a carbonate is precipitated on a very finely divided aquasol of the basic metal. The resulting mixture is filtered, washed, dried and pulverized and then reduced. Co-precipitation of a reducible metal and a refractory oxide component has also been used. The composite metal-metal oxide which results from either of these techniques is compressed, and sintered and the resulting billet is machined, encased and extruded.

Another prior art method is an oxidation-reduction process in which metal powders are ground together, the powder oxidized, and then the metallic portion is reduced to give a metal-metal oxide composite. Other prior art methods include mixing the required constituents in a colloid mill and then reducing; oxidizing the surface of finely divided metal powders with subsequent compacting and sintering; and the process of internal oxidation in which a dilute alloy containing a relatively noble metal and an oxidizable solute is oxidized.

None of these prior art methods achieve more than a moderate degree of dispersion within a base constituent, and they do not result in composite materials of comparable properties.

Objects of invention

We have found a direct and economical method by which we can form composite systems in which the degree of mixing is so complete as to approach or actually attain molecular dispersions.

It is therefore a primary object of this invention to provide a method of forming systems of composite materials in which the constituents are metals or metal oxides and are so uniformly homogeneously dispersed as to attain or approach molecular dispersions. It is another object of this invention to provide a method of the character described which is adaptable to all metals which form soluble salts and solid oxides. It is another object of this invention to provide a method of forming composite materials which approach molecular dispersions and which exhibit tensile strengths which are markedly greater than comparable systems prepared by prior art techniques. It is a further object of this invention to provide a method of the character described which makes it possible to accurately control the degree of mixing attained. It is an additional object to provide a relatively simple and economical method of forming homogeneous composite systems which may be metal-metal, metal-metal oxide or metal oxide-metal oxide.

It is another primary object of this invention to provide new and improved homogeneous composite materials, the constituents of which are metals and metal oxides and the properties of which are controllable and reproducible and represent improvements over comparable materials now available.

Other objectives of the invention will in part be obvious and will in part be apparent hereinafter.

The invention accordingly comprises the several steps and the relation of one or more of such steps with respect to each of the others, and the article possessing the features, properties and the relation of elements which are exemplified in the following detailed disclosure, and the scope of the invention will be indicated in the claims.

Description of the method

For a fuller understanding of the nature and objects of the invention reference should be had to the following detailed disclosure taken in connection with the accompanying drawings in which FIG. 1 represents a flow diagram of the method of this invention;

Figure 5:
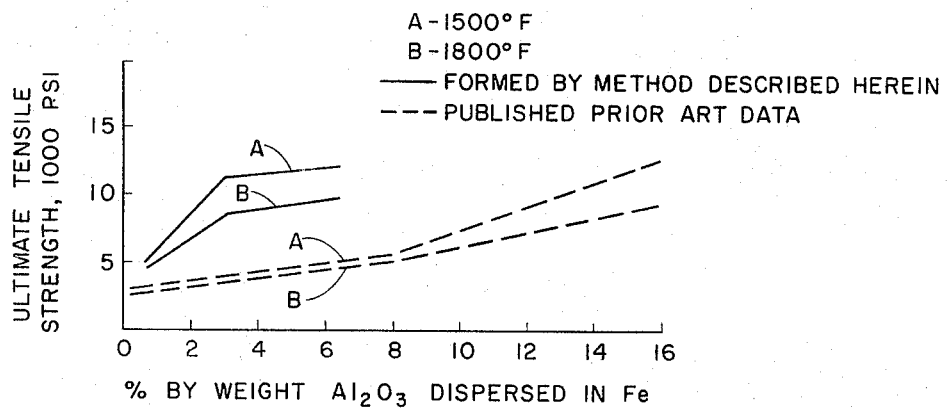
Figure 6:
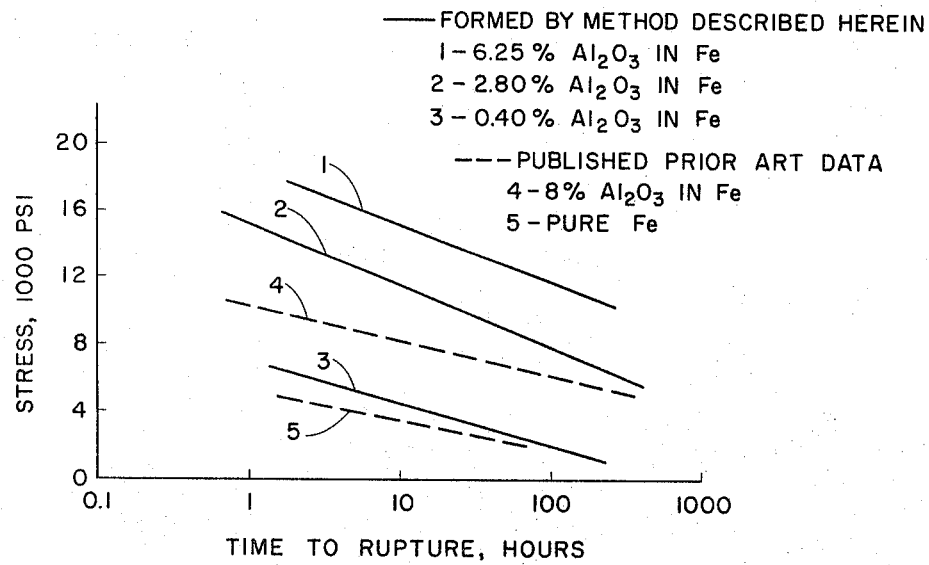

FIG. 5 is a plot of tensile strength vs. dispersed oxide concentration of an Fe-$Al_2O_3$ system measured at different temperatures comparing composites made by the method of this invention and prior art methods; and FIG. 6 is a plot of stress vs. time to rupture for an Fe-$Al_2O_3$ system for various oxide concentrations comparing composites made by the method of this invention and prior art methods.

Figure 1:
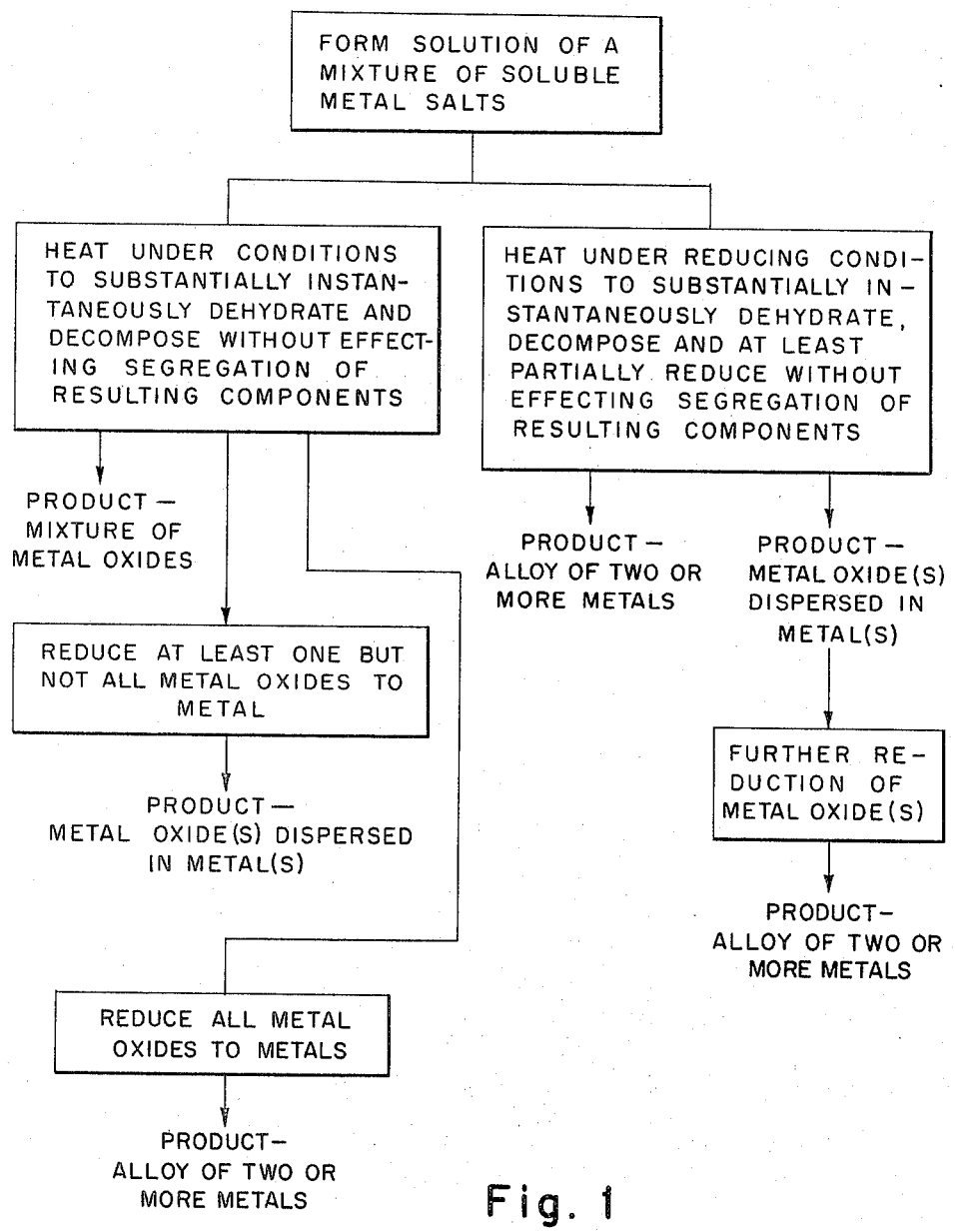

Turning now to FIG. 1, which is a flow diagram, it will be seen that the method of this invention begins with the formation of a solution of two or more metal salts. This solution is then heated to simultaneously dehydrate and decompose the salts to the oxides, the heating being accomplished at a temperature and under conditions to apply to the liquid a thermal load of a magnitude sufficient to cause the simultaneous dehydration and decomposition to be completed before any appreciable segregation of the constituents in the liquid can take place. This, in turn, requires that the rate of simultaneous dehydration and decomposition be greater than the rates of diffusion of the individual liquid solution constituents.

The product which results from this step of simultaneously dehydrating and decomposing is a homogeneous composite of metal oxides. This composite may be used without further chemical treatment, it may be partially reduced to form a metal-metal oxide composite, or it may be completely reduced to form a metal-metal composite. As is apparent from this brief description of the method of this invention, if one or more components in the final composite material is to be a metal, then it must be a metal, the oxide of which is chemically reducible. Examples of each of these systems will be given to further illustrate these three classes of composites.

As an alternative to effecting reduction in a separate step, it is possible and within the scope of this invention to carry out all or part of the required reduction concurrently with dehydrating and decomposing. This is also illustrated in FIG. 1.

Figure 2:
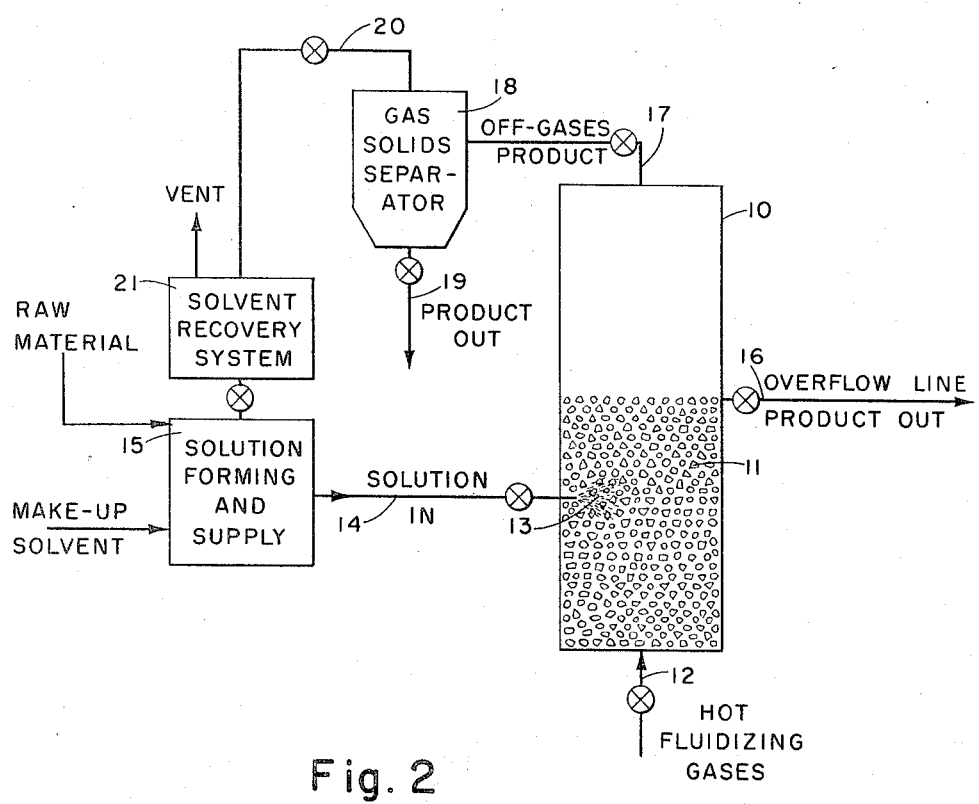
FIG. 2 is a simplified drawing of the preferred way of carrying out the steps of this invention in a fluid bed.
Figure 3:
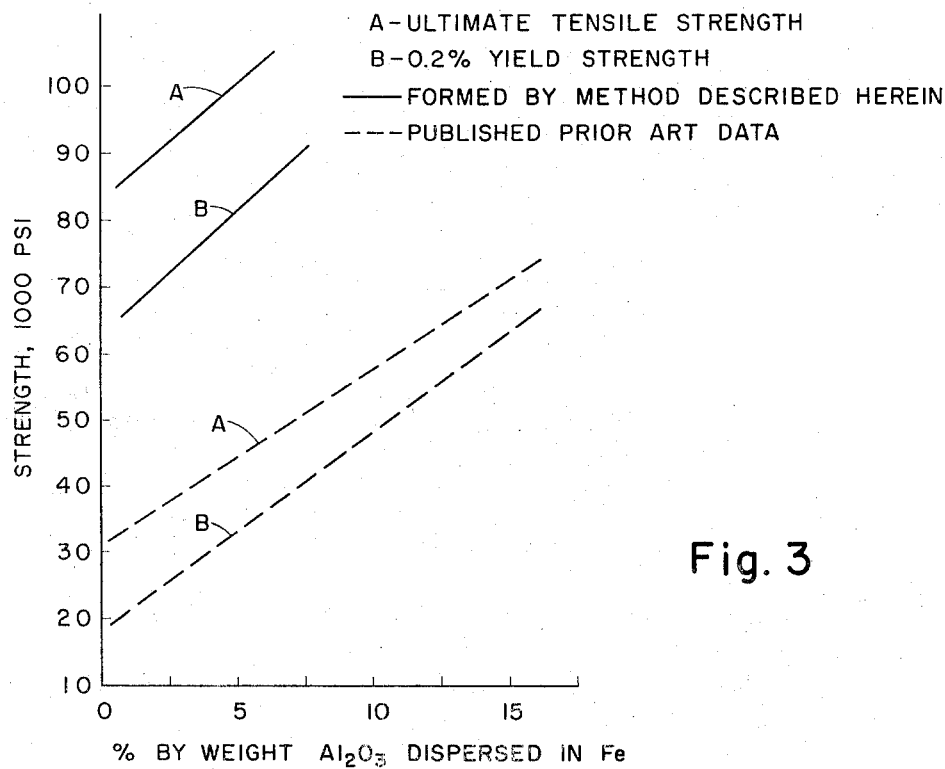
FIG. 3 is a plot of tensile strength vs. oxide concentration of an Fe-Al$_2$O$_3$ system comparing composites made by the method of this invention and prior art methods.
Figure 4:
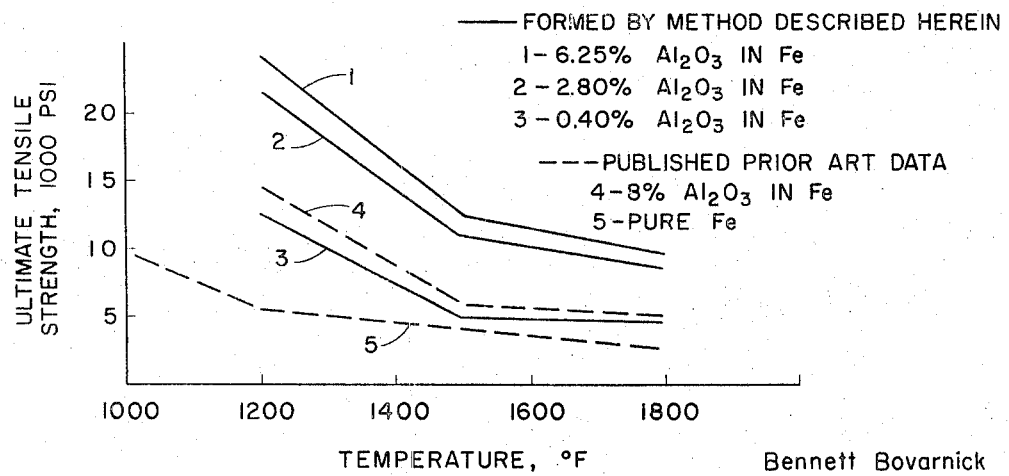
FIG. 4 is a plot of tensile strength vs. temperature of an Fe-Al$_2$O$_3$ system with varying oxide concentrations comparing composites made by the method of this invention and prior art methods.

FIG. 2 illustrates the preferred embodiment of this invention. In this preferred embodiment the step of simultaneously dehydrating and decomposing the solution is carried out in a fluidized bed 10. The use of a fluidized bed is a well developed technique and is described in such texts as "Fluidization" by Max Leva, McGraw-Hill Book Company, Inc., New York (1959) and "Fluidization and Fluid-Particle Systems" by Frederick A. Zenz and Donald F. Othmer, Reinhold Publishing Corporation, New York (1960). Because it is a well-known technique, the fluid bed will not be described in detail. However, the operating conditions as they pertain to the practice of this invention will be discussed. Within the fluid bed 10 are solid particles 11 which are maintained in a fluid state through the use of high temperature fluidizing gases which are introduced into the bottom of the bed through inlet line 12. As an alternative to using hot gases or as a supplement to their use, all or part of the heat can be put into the fluidized particles by heating the walls of the column enclosing the bed. This results in more flexibility of choice of fluidizing gases.

It is on the hot particles in the fluidized bed that a great portion of the step of simultaneously dehydrating and decomposing is carried out. The liquid solution of the mixture of metal salts is introduced in the form of atomized droplets 13 by way of inlet conduit 14 from the solution supply 15 into the bed of hot particles, and probably most of the droplets strike the hot particles to wet them and to, in turn, be dehydrated and decomposed. When the product material is primarily withdrawn on the bed particles a cross-section of a typical particle shows that the composite material is built up as layers or skins on the particles. Due to the very hot gases surrounding the bed particles some of the atomized solution droplets apparently dehydrate and decompose as discrete droplets before they can contact the bed particles.

In keeping with fluid bed practice an overflow line 16 communicates with the interior of the bed container at a point corresponding to the solid-gas interface. A line 17 is provided for removing the off-gases from the upper portion of the apparatus. These off-gases are in turn directed into a suitable gas-separator 18 for discharging the solids through line 19 and the gaseous by-products through line 20. As noted in FIG. 2 the product solid material is withdrawn either through the overflow line 16, in the form of the solids separated from the off-gases and discharged through line 19, or at both places. Finally, if desired, the off-gases may be treated to recover the gaseous decomposition products for use in reforming the original solution.

In operating the fluid bed to carry out the steps of this invention, the solid particles which are maintained in a fluidized state and serve as the hot bodies on which the solution is dehydrated and decomposed may be either of the same material which is to form the final product delivered by the bed or the particles may be of an inert material such as iron ore, mill scale and the like for non-reducing conditions or such as alumina or titania, zirconia and the like for reducing or oxidizing conditions. If inert particles are used, generally the solid product will be deposited on the particles, subsequently abraded off the particles and taken out of the fluid bed in the off-gases where the solid product is separated for discharge through line 19 of FIG. 2.

If, on the other hand, the particles are formed of the material which is to be the final product, then they, as the product material, will be taken out in the overflow line 16, with some of the product material going out with the off-gases. In this case, the bed is capable of reseeding itself because small amounts of the product material are furnished as seed particles either through the process of abrading off the larger particles, through the dehydration and decomposition of discrete droplets of solution as previously noted, or through a combination of these. It is also, of course, possible to return some fines from overhead to serve as seed particles, or to crush or grind coarse material for return to the bed.

Using FIG. 2, it will now be possible to describe the method in detail with reference to suitable metals, formation of the solution, operational variables and the like.

The metals which may be used in the method of this invention to form metal-metal, metal-metal oxide, or metal oxide-metal oxide systems may be defined as those which form soluble salts and solid metal oxides. A number of metal oxides can be reduced and these metals can therefore be conveniently used to form the metal portion of such composites. Among such metals are iron, silver, tungsten, copper, nickel, molybdenum, tantalum, cobalt and platinum. There are a number of metals which form oxides which are extremely difficult to reduce and these will generally be used as the metal oxide constituent or constituents of a composite material prepared in accordance with this method. These metals include aluminum, columbium, titanium, thorium, zirconium, silicon, chromium, magnesium, beryllium, zinc and cadmium.

In order to put the salts of these metals into solution, it is convenient to dissolve the metal in a strong mineral acid such as nitric, sulfuric, or hydrochloric, forming in the solution the metal nitrate, sulfate, or chloride. It is often preferred to add an excess of the solvent to insure complete solution. In like manner an organic acid, e.g., acetic, can be used, and in the case of some metallic salts aqueous solutions or solutions in strong bases such as ammonium hydroxides or carbonates are desirable. The necessary solution may also be a molten hydrated salt with or without additional water. Many of the metal nitrate salts, for example, are highly hydrated. These include, but are not necessarily limited to, $Al(NO_3)_3 \cdot 9H_2O$, $Fe(NO_3)_3 \cdot 9H_2O$, $Ni(NO_3)_2 \cdot 6H_2O$ and $CO(NO_3)_2 \cdot 6H_2O$. In like manner many of the metal sulfates are also hydrated. In using many of these, it is only necessary to heat the hydrated salt to the point where it dissolves in its own water of hydration.

Soluble metal salts, other than those of the strong mineral acids, may be illustrated by $$(NH_4)_6Mo_7O_{24} \cdot 4H_2O$$

which may be added to a hot nitric acid solution; $CrO_3$ which is soluble in water; $Pb(C_2H_3O_2)_2$ which is soluble in water and can be highly hydrated; and some forms of molybdic and tungstic oxides which can be dissolved in ammoniacal solvents.

In forming the solution of the mixed salts it is possible to make up separate solutions of each of the metal salt components and then mix them thoroughly, or the solution may be formed by adding all of the salts to one quantity of solvent, provided, however, no precipitation occurs in either case. The concentration of the solution used is controlled and limited by the solubility of the various salts in the solvent system being used. It is generally preferable to use the higher concentrations which are compatible with forming a solution (all components in the liquid phase). The higher the concentration is, the smaller will be the amount of volatiles which must be removed. This, in turn, results in minimizing heat input into the fluid bed and also contributes to the prevention of component segregation during the dehydrating-decomposing step.

In the preferred embodiment of FIG. 2, it is generally preferable to pump the solution under pressure (50 to 200 p.s.i.) into the bed through a suitable atomizing nozzle. It is also, of course, within the scope of this invention to preheat the solution, if it is not already heated, prior to its introduction into the fluid bed in order to reduce its viscosity and make it more readily sprayable, to reduce the heat input into the bed and to insure complete solution. The size of the particles 11 within the fluid bed 10 (FIG. 2) will be in keeping with accepted fluidized bed technique. Since it is necessary to apply a thermal load to the droplets 13 of the liquid solution introduced into the bed which is sufficiently great to achieve dehydration and decomposition almost instantaneously, it is necessary that the ratio of bed particle diameter to solution droplet diameter be maintained to apply this required thermal load. Generally the bed particle diameter must be at least ten times the diameter of the solution droplets. Preferably this ratio of bed particle diameter to solution droplet diameter should be from 100:1 to 1000:1.

It has been found that in order to carry out the combined step of dehydration and decomposition in the fluid bed without permitting any segregation of the product constituents, it is preferred to introduce the atomized solution below the fluid-gas interface and preferably within the middle third of the bed depth.

In keeping with standard fluid bed techniques, the fluidizing gases will normally be combustion products. However, if all or part of the reduction of the oxides is to take place concurrently with dehydration and decomposition then the fluidizing gases should contain adequate quantities of strong reducing gases such as hydrogen and carbon monoxide to effect the necessary reduction.

The spatial velocity of the fluidizing gases entering through line 12 (FIG. 2), which is defined as the velocity of the fluidizing gases measured at the operating temperature and pressure of the fluid bed reactor disregarding the space occupied by the solid particles, should be at least somewhat higher than that required to maintain fluidizing conditions in the bed material. The spatial velocity should, however, not be so great as to elutriate the bed material. The choice of an optimum spatial velocity will depend upon operating conditions which, in turn, are dictated by other factors such as the heat requirements of the system which, in turn, may be adjusted to some extent and determined by the economics of the system. This optimum fluidizing state will also be determined for any system to coincide with that point at which good quality fluidization is obtained. Finally the spatial velocity will be determined, at least to some extent, by the choice of the product withdrawal point. In general, the higher the velocity, the larger quantity of product will be discharged with the off-gases.

The actual temperature of the fluidized particles will, of course, vary depending upon the solution used and the final product produced. The fluid bed operating temperature should be substantially greater (i.e., at least 100° C. higher) than the decomposition temperature of the metal salts in the solution. This temperature should, however, be below the melting point of the lowest melting solid contained in the solid product. Between these minimum and maximum temperature limits is a range which offers the choice of an optimum temperature for any one system. If, for example, it is more desirable to reduce heat requirements and to diminish the thermal degradation of the off-gases then the lower operating temperatures within the range will be used. If, on the other hand, it is more desirable to optimize the kinetics of decomposition and to obtain the solid product in very finely divided form then the higher operating temperatures within the range will be used. Typical fluid bed operating temperatures will be illustrated in the examples.

As the solution of mixed metal salts is atomized within the fluid bed the droplets formed impinge on the hot bed particles which are capable of delivering the required thermal load to simultaneously dehydrate and decompose the metal salts solution without segregating the components. The reactions which take place substantially instantaneously may be illustrated for salts of nickel, iron, aluminum, chromium and lead using nitrate salts and molybdenum using an ammoniacal salt:

$$Ni(NO_3)_2 + heat \rightarrow NiO + NO + NO_2 + O_2$$
$$2Fe(NO_3)_3 + heat \rightarrow Fe_2O_3 + 3NO + 3NO_2 + 3O_2$$
$$2Al(NO_3)_3 + heat \rightarrow Al_2O_3 + 3NO + 3NO_2 + 3O_2$$
$$2Cr(NO_3)_3 + heat \rightarrow Cr_2O_3 + 3NO + 3NO_2 + 3O_2$$
$$Pb(NO_3)_2 + heat \rightarrow PbO + NO + NO_2 + O_2$$
$$(NH_4)_6Mo_7O_{24} + heat \rightarrow 7MoO_3 + 6NH_3 + 3H_2O$$

It will be appreciated that these reactions do not take into account the possibility of a number of side reactions, such as the formation of $H_2$ etc. They are offered here as illustrative of the manner in which the metal oxides are formed in the decomposition of the metal salts.

As previously stated, the step of reducing some of the oxides may also be performed concurrently with the step of dehydrating-decomposing in the fluid bed if strongly reducing gases such as hydrogen and carbon monoxide are present in sufficient quantity in the fluidizing gases. Assuming reduction takes place with dehydration and decomposition, then the reactions for the nickel, iron, lead and molybdenum salts in the fluid bed may be written as follows using hydrogen as a reducing gas:

$$Ni(NO_3)_2 + heat + 3H_2 \rightarrow Ni + NO + NO_2 + 3H_2O$$
$$2Fe(NO_3)_3 + heat + 9H_2 \rightarrow 2Fe + 3NO + 3NO_2 + 9H_2O$$
$$(NH_4)_6Mo_7O_{24} + heat + 21H_2 \rightarrow 7Mo + 6NH_3 + 24H_2O$$

As in the case of the decomposition reactions, these reduction reactions should be considered to be in a somewhat simplified form since many side reactions are possible in these too.

The solid product withdrawn from the fluidized bed with the off-gas, is a fine powder which generally requires no grinding or other mechanical working. Likewise, much of the product which is discharged through the overflow does not require any communition. However, some of it may be coarse enough to require some grinding. This is readily done in standard grinding equipment. If one or more of the metal oxides is to be reduced and reduction was not carried out concurrently with the step of dehydrating-decomposing, then the finely divided powder product will be further treated, either in another fluid bed, or in any suitable apparatus and under reducing conditions compatible with the material being handled. Reducing as a separate step may be carried out in a controlled, atmosphere furnace as commercially employed in powder metallurgical processes.

It is possible to employ apparatus other than the fluid bed for accomplishing the simplified dehydration and decomposition. Such apparatus include spray dryers, means for contacting the solution with a plasma, or rotary kilns. However, each of these processes has the drawback of using hot gases rather than the hot solid particles of the fluidized bed. Inasmuch as the specific heat capacity of a gas is much less than that of a solid, difficulties may be encountered in providing the required thermal load to substantially instantaneously dehydrate and decompose the solution droplets.

The off-gases which may or may not carry in them a major quantity of solid product (FIG. 2) are processed to separate from them any entrained solids; and after this separation, the gases are preferably directed into a suitable solvent recovery system 21. For example, oxides of nitrogen, or sulfur may be processed to form the respective acids for use in forming additional solutions. Ammonia, chlorine or HCl gas may also be recovered and recycled. The ability to recover the gas for converting into solvent means that once the cycle has been begun, it is only necessary to add make-up solvent. This, in turn, reduces the cost of producing the composite product.

The following examples are given to further illustrate the method of this invention and the improved quality of the products which result therefrom. These examples are not meant to be limiting.

In preparing these examples the iron, aluminum and nickel were used in the form of the commercially available hydrated forms, i.e., as $Fe(NO_3)_3 \cdot 9H_2O$, $$Al(NO_3)_3 \cdot 9H_2O$$

and $$Ni(NO_3)_3 \cdot 6H_2O$$

The molybdenum was obtained as the ammonium molybdate salt $(NH_4)_6Mo_7O_{24} \cdot 4H_2O$ to which were added water and 70% aqueous $HNO_3$ in weight proportions of 8 and 8.8%, respectively. The composite systems formed in these examples were those in which a small quantity of $Al_2O_3$ was dispersed in an iron matrix, and an alloy of iron, nickel and molybdenum. In general, the method comprised preparation of the solution of the mixed salts, the carrying out of the dehydration-decomposition step in a fluid bed and the subsequent reduction in a heated, closed steel retort.

The solutions of iron and aluminum nitrates were formed by melting the hydrated salts in a 20-gallon tank equipped with a steam coil. The solutions of iron and nickel nitrates with the amonium molybdate were made by preparing a molten salt solution of the iron and nickel nitrates and adding to that the hot nitric acid solution of the ammonium molybdate.

The hot salt solutions thus prepared were then pumped under 80 pounds of pressure to a nozzle located within the middle third of the bed particles of a fluid bed. The fluid bed used was a 6-inch unit, 9 feet in height which was coupled to a refractory-lined combustion chamber and a high velocity burner operating on natural gas and compressed air.

A coarse high-grade iron ore was used as the starting bed and served as an inert material on which the finely divided powdered product collected. Since the bed particles were of an inert material the fine product was carried with the off-gases to two cyclone separators from which was discharged the solid product material. The fluid bed was operated at a temperature between 500 and 525° C. and a spatial velocity of 2.5 feet per second. Under these circumstances the unit produced about 6 pounds of product per hour of feed time with external heat being applied to the column to balance any heat losses through the column walls. The products from the fluid bed were the composite oxides. Under the fluid bed operating conditions described these powders were in the subsieve size range (−325-mesh).

The following tabulations give the composition of the original solution, the operating conditions of the bed in which the dehydration-decomposition step was carried out, and the composition of the resulting composite oxides.

TABLE I.—FORMATION OF COMPOSITE OXIDES POWDERS

| Example No. | Feed Material, Weight Percent | | | | Fluid Bed Temp., ° C. |
|---|---|---|---|---|---|
| | $Fe(NO_3)_3 \cdot 9H_2O$ | $Al(NO_3)_3 \cdot 9H_2O$ | $Ni(NO_3)_3 \cdot 6H_2O$ | $(NH_4)_6Mo_7O_{24} \cdot 4H_2O$ | |
| 1 | 91.8 | 8.2 | | | 500 |
| 2 | 98.0 | 2.0 | | | 525 |
| 3 | 23.6 | | 75.0 | 1.4 | 500 |

TABLE 2.—ANALYSIS OF COMPOSITE OXIDES POWDERS PRODUCED

| Example No. | Percent Fe | Percent $Fe_2O_3$ Calc. | Percent $Al_2O_3$ Diff. | Percent Ni | Percent $Ni_2O_3$ Calc. | Percent Mo | Percent $MoO_3$ Calc. |
|---|---|---|---|---|---|---|---|
| 1 | 66 | 94.4 | 5.6 | | | | |
| 2 | 68.2 | 97.5 | 2.5 | | | | |
| 3 | 16.0 | 22.9 | | 50.9 | 71.7 | 2.6 | 3.9 |

In order to prepare a composite material in which $Al_2O_3$ is dispersed in iron, it was necessary to further treat the $Fe_2O_3$–$Al_2O_3$ composite produced in the fluid bed to reduce the $Fe_2O_3$ to iron. It will, of course, be appreciated that under reducing conditions capable of reducing $Fe_2O_3$ to Fe the $Al_2O_3$ is not reduced. Thus, it is possible to selectively reduce an oxide to form a composite material of dispersed oxides in metal. In a similar manner in order to form an alloy of iron, nickel and molybdenum it is necessary to reduce all of these oxides to the elemental metals. In this latter system, complete reduction is possible inasmuch as reducing conditions can be established which will effectively reduce all of these particular oxides.

The reduction of the solid product material as it was taken from the fluid bed was carried out by placing a tray of the solid powder in a closed retort consisting of a section of 4-inch stainless steel pipe fitted with screwed bushings at the end. The closed retort of the steel pipe was then heated by means of a 15 kw. globar furnace and gas was pumped through the retort. Nitrogen was flowed through the retort until the internal tube temperature approached that at which reduction was to take place. At this point hydrogen (employed as the active reducing agent) was substituted for nitrogen and its flow through the retort monitored to maintain a rate of about 30 cubic feet per hour. When water vapor was no longer detected in the off-gases, reduction was assumed to be essentially complete. However, to insure complete reduction the flow of hydrogen was continued for an additional hour. Then the heat was cut off and nitrogen was flowed through the retort until the temperature fell to room temperature. After the flow of nitrogen had been cut off the retort was opened by removing the end plug, and the reduced material checked for pyrophoricity.

sity is higher for the Example 1 specimens than for commercial powder specimens. The ductility of sintered iron in this density range is expected to be low and this was the case for the sintered Example 1 powder. It was also noted that on exposure to the atmosphere the hydrogen-sintered specimens were more sensitive to oxidation under ambient conditions than were the vacuum sintered bars.

TABLE 5.—STRENGTH OF SINTERED POWDERS (SINTERED 60 MINUTES AT 2,100° F.)

| Powder | Atmosphere | Compacting Pressure (t.s.i.) | Density, gm./cc. | Strength (p.s.i.) |
| --- | --- | --- | --- | --- |
| Example 1 | Hydrogen | 10 | 4.5 | 10,500 |
|  | do | 23.5 | 5.0 | 14,100 |
|  | Vacuum | 10 | 5.0 | 13,800 |
|  | do | 10 | 5.2 | 17,800 |
|  | do | 10 | 5.4 | 18,200 |
|  | do | 23.5 | 5.6 | 18,900 |
| Commercial Powder | Dissociated NH₃ |  | 5.1 | 10,000 |
|  | do | 16 | 5.5 | 15,000 |
|  | do | 21 | 5.9 | 19,500 |
|  | do | 30 | 6.3 | 23,800 |

The following tabulations summarize the operating conditions under which reduction was carried out, and the analysis of the final product.

TABLE 3.—REDUCTION OF OXIDE POWDERS

| Example No. | Reduction Temp., °C. | Reducing Gas | Reduction Time, Hrs. | Product Quality |
| --- | --- | --- | --- | --- |
| 1 | 730 | H₂ | 5.3 | Flaky, nonpyrophoric. |
| 2 | 720 | H₂ | 6.0 | Do. |
| 3 | 520 | H₂ | 5.1 | Lumpy, nonpyrophoric. |

TABLE 4.—ANALYSIS OF REDUCED POWDERS

| Example No. | Percent Fe | | | Percent Al₂O₃ | Percent Ni | | | Percent Mo Total |
| --- | --- | --- | --- | --- | --- | --- | --- | --- |
|  | Total | Metal | Percent Metalization |  | Total | Metal | Percent Metalization |  |
| 1 | 95.7 | 95.6 | 99.8 | 6.25 |  |  |  |  |
| 2 | 97.2 | 97.0 | 99.8 | 2.80 |  |  |  |  |
| 3 | 23.4 | 22.3 | 95.2 |  | 74.0 | 73.7 | 99.5 | 4.0 |

The as-reduced powders, agglomerated as sinter cakes during reduction, were screened through a 100-mesh sieve in order to provide a powder suitable for subsequent compacting operations. Some of the cakes could be pulverized with finger pressure; others required extended tumbling in a jar mill. The harder sinter cakes were recycled to the jar mill after initial screening to increase the yield of powder from a batch. All batches were kept independent until chemical analysis verified their equivalence, after which the batches of each type were blended. In general, the particle size distribution was on the fine side, the bulk of it passing through the 325-mesh sieve.

The powder treated in this way had a bulk density of 0.6–0.8 gm./cc., much lower than the bulk density of iron powders usually employed for compaction of parts (2.0–2.5 gm./cc.).

The mechanical properties exhibited by specimens pressed from Example 1 powder and sintered at 2100° F. in either vacuum or hydrogen are illustrated in Table 5. The powders were pressed to the MPIF standard flat tensile bar configuration at pressures from 10 to 23.5 t.s.i. No lubricant was employed during the compaction of the powders. In general, the strengths reported are seen to be dependent upon the sintered density, which is consistent with prior experience in this area. The strength of sintered iron powder base material of equivalent den- A peak value of 21,500 p.s.i. at a density of 5.61 gm./cc. was observed.

Extrusion billets weighing approximately one-half pound were prepared by cold compacting the powders into cans of thin-walled mild steel tubing at a pressure of 125,000 p.s.i. As a result of the high compressibility ratio of the powders, the billets were compacted in increments of about 2 ounces. Three billets of each powder were prepared to dimensions of 0.992" diameter and approximately 3" long within the tubing of 1 1/16" O.D. (20 gage wall). The billet cans were evacuated, outgassed at 800° F. and sealed after the residual pressure had been reduced below 0.1 micron Hg. The sealed billets were heated in graphite at 1950° F. for 2 to 2½ hours and were extruded directly from the holding temperature.

The extrusion conditions were:

| | |
| --- | --- |
| Extrusion liner (diameter at 900° F.) | 1.100" |
| Extrusion die (diameter at 900° F.) | 0.252" |
| Lubrication (dag.) | 0.1 |
| Reduction | 19× |
| Ram speed | 90"/min. |

The data which resulted from the measurement of the mechanical properties are plotted in FIGS. 3–6. It will be seen in FIG. 3 that both the ultimate tensile strength and the 0.2% yield strength are very much greater than for the prior art material prepared under similar extrusion conditions. See Transactions of the Metallurgical Section of ASME, 215, October 1959, pp. 753–755 which is the source of the published prior art data plotted in FIGS. 3–6. This superiority in tensile strength in the material of this invention is again indicated in FIG. 4 where this property is plotted against dispersed oxide concentration and shows that at 1500 and 1800° F. the material prepared in accordance with the teaching of this invention is superior to the prior art materials. This superiority is also illustrated in FIG. 6 in which time to rupture is plotted against stress.

It is believed that the very marked increase in strength exhibited by the $Al_2O_3$ dispersed-hardened iron made in accordance with this invention is a measure of the completeness and thoroughness of the dispersion of the relatively small quantity of $Al_2O_3$ contained, therefore it is concluded that this is a homogeneous composite material which approaches or may even attain molecular dispersion.

In performing the chemical reduction as a separate step it was found that the effectiveness of the alumina dispersion in the metallic iron matrix was evident from the temperature required during hydrogen reduction to produce a non-pyrophoric product. The higher alumina contents made the reduced powder more refractory in character and this, in turn, made it more difficult (i.e., required higher temperatures) to deactivate or passivate, the surface of the finely divided powder by surface sintering. Inasmuch as pyrophoricity is a direct qualitative indication of the specific chemical activity of the surface of such a material there is offered by the method of this invention a means for controlling surface activity. This, in turn, offers a method of forming surface active catalysts, the properties of which can be controlled. Typical minimum sintering temperatures required to eliminate pyrophoricity in iron containing 0.41%, 2.80% and 6.25% $Al_2O_3$ dispersed therein were 600°, 660° and 730° C., respectively.

The magnetic alloy powder of Example 3 was screened after being reduced so that it passed a 100-mesh sieve and was essentially all retained on a 325-mesh sieve. The powder was compacted under 60,000 p.s.i. into toroids of 1.03-inch O.D., 0.81-inch I.D. and 0.125-inch high. The toroids averaged 3.2 grams in weight and had a bulk density of 5.0 gm./cc. or about 57% of theoretical composite density. These toroids, which had a relatively low bulk density, exhibited magnetic properties which indicated that composites made by the method of this invention offer great promise of being formed into magnetic alloy materials with "tailor-made" properties.

These examples, taken in connection with the detailed description, illustrate the efficacy of the method of this invention in providing homogeneous composite materials in which the constituents are so efficiently dispersed as to approach or attain molecular dispersion. This fact is clearly indicated by the very marked improvement in mechanical properties of the dispersion-hardened product when compared with comparable materials prepared by the best techniques now known.

The method of this invention is, moreover, applicable to many systems of composite materials containing metals and/or metal oxides and is both versatile and flexible with respect to the composite materials produced. There are no real limitations on the ratios of the various constituents which can be incorporated into a composite material so long as they can be formed in a solution of mixed salts which upon dehydration-decomposition yield the respective oxides. The ability to reduce the oxides to the elemental metals will, of course, depend upon the chemical properties of the oxides.

The homogeneous composite materials which results from the method of this invention exhibit such a marked increase in mechanical strength that it is believed they represent a novel product. Although we do not wish to be bound by the brief theoretical discussion herewith presented, it appears that the following may be a logical explanation. X-ray diffraction examination of the $Fe_2O_3$—$Al_2O_3$ powder showed only the characteristic pattern of $Fe_2O_3$; and the same type of examination of the Fe—$Al_2O_3$ powder showed only the pattern of the alpha iron lattice. The conclusions which may be drawn from these observations are that either (1) the $Al_2O_3$ is in solid solution in the $Fe_2O_3$ or Fe lattice, or (2) if the $Al_2O_3$ exists as a discrete phase its grain size is then below the limits of resolution of the X-ray diffraction technique. In either case, an extremely high degree of mixing and resulting homogeneity is shown. It may therefore be concluded that by beginning with a true solution of the mixed metal salts and by substantially instantaneously dehydrating and decomposing these solutions it is possible to avoid any measurable segregation of the composite constituents. Therefore, the final composite materials may be described as truly homogeneous in character.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

We claim:

1. A method of forming a chemically homogeneous solid composite product, consisting of the steps of
    (a) forming a solution of mixed metallic salts thermally decomposable to metallic oxides; and
    (b) introducing said solution in the form of atomized droplets beneath the solid-gas interface of a fluidized bed to cause the solution droplets to impinge on hot fluidized bed particles, the temperature and size of said particles being such that they apply to the atomized droplets a thermal load of sufficient magnitude to substantially instantaneously and completely dehydrate and decompose said solution before any appreciable diffusing of the individual components of the resulting solid product can effect segregation of said components thereby forming a solid powder particle which is a chemically homogeneous composite of the metal oxides formed in said decomposing.

2. A method in accordance with claim 1 wherein said fluidized bed particles are at a temperature at least 100° C. above the decomposition temperature of said metallic salts and below the melting point of the lowest melting metal oxide formed.

3. A method in accordance with claim 1 wherein the diameters of said fluidized bed particles are at least ten times the diameter of said solution droplets.

4. A method in accordance with claim 1 wherein the solvent in said solution is aqueous nitric acid.

5. A method in accordance with claim 1 wherein said solution is characterized as comprising a mixture of molten hydrated nitrate salts of said metals.

6. A method in accordance with claim 1 wherein said gas in said fluidized bed contains a reducing agent for at least one of said metal oxide constituents in said fluidized bed whereby said metal oxide is reduced concurrently with its dehydration and decomposition.

7. A method of forming a chemically homogeneous solid composite product, comprising the steps of
    (a) forming a solution of mixed metallic salts thermally decomposable to metallic oxides;
    (b) introducing said solution in the form of atomized droplets beneath the solid-gas interface of a fluidized bed to cause the solution droplets to impinge on hot fluidized bed particles, the temperature and size of said particles being such that they apply to the atomized droplets a thermal load of sufficient magnitude to substantially instantaneously and completely simultaneously dehydrate said solution and thermally decompose said metallic salts to their respective oxides and to form a solid powder particle which is a chemically homogeneous product composite of said oxides;

(c) introducing hot fluidizing gases into said fluidized particles thereby to maintain said particles at a temperature at least 100° C. above the decomposition temperature of said metallic salts and below the melting point of the lowest melting constituent formed;

(d) discharging said solid product composite from said fluidized bed;

(e) withdrawing off-gases from said fluidized bed; and (f) recovering said off-gases as solvent for reforming said solution.

8. A method in accordance with claim 7 wherein said fluidized bed particles are formed of an inert material and a major portion of said solid product composite is withdrawn from said fluidized bed with the off-gases.

9. A method in accordance with claim 7 wherein said fluidized bed particles are formed of said composite of said oxides and a major portion of said solid product composite is withdrawn from said fluidized bed adhered to said particles.

10. A method of dispersing metal oxides in a metal system, comprising the steps of (a) forming a solution of metal salts which are thermally decomposable to the respective metal oxides, at least one of said metal oxides being incapable of chemical reduction under conditions which chemically reduce the remaining metal oxides; and (b) introducing said solution in the form of atomized droplets beneath the solid-gas interface of a fluidized bed to cause the solution droplets to impinge on hot fluidized bed particles, the temperature and size of said particles being such that they apply to the atomized droplets a thermal load of sufficient magnitude to substantially instantaneously and completely dehydrate and decompose said solution before any appreciable diffusing of the individual components of the resulting solid bed can effect segregation of said components thereby forming a solid powder particle which is a chemically homogeneous product composite of said oxides; and (c) chemically reducing said remaining metal oxides to metals thereby to form a chemically homogeneous dispersion of said oxides in said metals.

References Cited by the Examiner

UNITED STATES PATENTS

| | | | |
|---|---|---|---|
| 2,677,608 | 5/1954 | McKay et al. | 75—9 |
| 2,786,742 | 3/1957 | McKinley et al. | 23—288 |
| 2,893,859 | 7/1959 | Triffleman | 75—.55 |
| 2,900,244 | 8/1959 | Bradstreet et al. | 75—.55 |
| 3,070,436 | 12/1962 | Triffleman | 75—.55 |
| 3,186,102 | 6/1965 | Brociner et al. | 34—10 |

BENJAMIN HENKIN, *Primary Examiner.*